(12) United States Patent
Ide et al.

(10) Patent No.: US 10,844,993 B2
(45) Date of Patent: Nov. 24, 2020

(54) ELECTRIC-RESISTANCE-WELDED STAINLESS CLAD STEEL PIPE OR TUBE

(71) Applicant: JFE STEEL CORPORATION, Tokyo (JP)

(72) Inventors: Shinsuke Ide, Tokyo (JP); Atsushi Matsumoto, Tokyo (JP); Yuji Hashimoto, Tokyo (JP); Takatoshi Okabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/830,268

(22) Filed: Mar. 26, 2020

(65) Prior Publication Data

US 2020/0224813 A1    Jul. 16, 2020

Related U.S. Application Data

(63) Continuation of application No. 16/311,831, filed as application No. PCT/JP2017/015789 on Apr. 19, 2017.

(30) Foreign Application Priority Data

Jun. 30, 2016 (JP) .................................. 2016-129630
Sep. 12, 2016 (JP) .................................. 2016-177921

(51) Int. Cl.
*F16L 58/08* (2006.01)
*B21C 37/08* (2006.01)
(Continued)

(52) U.S. Cl.
CPC ............. *F16L 58/08* (2013.01); *B21C 37/08* (2013.01); *B21C 51/00* (2013.01); *B23K 11/00* (2013.01);
(Continued)

(58) Field of Classification Search
CPC ..... F16L 9/02; F16L 9/16; F16L 9/165; F16L 9/17; F16L 9/18; F16L 58/08;
(Continued)

(56) References Cited

U.S. PATENT DOCUMENTS 9,228,250 B2    1/2016  Alves et al.
2013/0259739 A1*  10/2013  Alves ................... B23K 35/304
                                                   420/582
(Continued)

FOREIGN PATENT DOCUMENTS

CN       101353765 A       1/2009
CN       103028631 A       4/2013
(Continued)

OTHER PUBLICATIONS

Aug. 1, 2017, International Search Report issued in the International Patent Application No. PCT/JP2017/015789.
(Continued)

*Primary Examiner* — Michael E. La Villa
(74) *Attorney, Agent, or Firm* — Kenja IP Law PC

(57) ABSTRACT

An electric-resistance-welded stainless clad steel pipe or tube that is excellent in both the fracture property of the weld and the corrosion resistance of the pipe or tube inner surface as electric resistance welded without additional welding treatment such as weld overlaying after electric resistance welding is provided. An electric-resistance-welded stainless clad steel pipe or tube comprises: an outer layer of carbon steel or low-alloy steel; and an inner layer of austenitic stainless steel having a predetermined chemical composition, wherein a flatness value h/D in a 90° flattening test in accordance with JIS G 3445 is less than 0.3, and a pipe or tube inner surface has no crack in a sulfuric acid-copper sulfate corrosion test in accordance with ASTM A262-10,
(Continued)

Practice E, where h is a flattening crack height (mm), and D is a pipe or tube outer diameter (mm).

2 Claims, 5 Drawing Sheets

(51) Int. Cl.
| | |
|---|---|
| B21C 51/00 | (2006.01) |
| B23K 20/227 | (2006.01) |
| B23K 11/34 | (2006.01) |
| B23K 11/16 | (2006.01) |
| B23K 20/04 | (2006.01) |
| B23K 20/02 | (2006.01) |
| B23K 11/00 | (2006.01) |
| F16L 9/16 | (2006.01) |
| F16L 9/18 | (2006.01) |
| B23K 13/02 | (2006.01) |
| F16L 9/17 | (2006.01) |
| C22C 38/12 | (2006.01) |
| C22C 38/40 | (2006.01) |
| C22C 38/20 | (2006.01) |
| C22C 38/24 | (2006.01) |
| C22C 38/48 | (2006.01) |
| C22C 38/22 | (2006.01) |
| C22C 38/42 | (2006.01) |
| C22C 38/00 | (2006.01) |
| C22C 38/02 | (2006.01) |
| C22C 38/18 | (2006.01) |
| C22C 38/06 | (2006.01) |
| C22C 38/26 | (2006.01) |
| C22C 38/50 | (2006.01) |
| C22C 38/38 | (2006.01) |
| C22C 38/08 | (2006.01) |
| C22C 38/46 | (2006.01) |
| C22C 38/04 | (2006.01) |
| C22C 38/14 | (2006.01) |
| C22C 38/28 | (2006.01) |
| C22C 38/16 | (2006.01) |
| B32B 15/04 | (2006.01) |
| B32B 15/01 | (2006.01) |
| B32B 15/00 | (2006.01) |
| B32B 1/08 | (2006.01) |
| B32B 15/18 | (2006.01) |
| B23K 31/02 | (2006.01) |
| F16L 9/02 | (2006.01) |
| F16L 57/02 | (2006.01) |
| B23K 11/087 | (2006.01) |
| B23K 13/08 | (2006.01) |
| C22C 38/58 | (2006.01) |
| C22C 38/44 | (2006.01) |
| B23K 11/08 | (2006.01) |
| B23K 101/06 | (2006.01) |
| B23K 103/04 | (2006.01) |
| B23K 101/10 | (2006.01) |
| B23K 103/18 | (2006.01) |

(52) U.S. Cl.
CPC ........ *B23K 11/002* (2013.01); *B23K 11/0006* (2013.01); *B23K 11/0026* (2013.01); *B23K 11/0073* (2013.01); *B23K 11/08* (2013.01); *B23K 11/087* (2013.01); *B23K 11/0873* (2013.01); *B23K 11/16* (2013.01); *B23K 11/163* (2013.01); *B23K 11/34* (2013.01); *B23K 13/02* (2013.01); *B23K 13/025* (2013.01); *B23K 13/08* (2013.01); *B23K 20/023* (2013.01); *B23K 20/04* (2013.01); *B23K 20/227* (2013.01); *B23K 31/027* (2013.01); *B32B 1/08* (2013.01); *B32B 15/00* (2013.01); *B32B 15/01* (2013.01); *B32B 15/011* (2013.01); *B32B 15/04* (2013.01); *B32B 15/043* (2013.01); *B32B 15/18* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/02* (2013.01); *F16L 9/16* (2013.01); *F16L 9/165* (2013.01); *F16L 9/17* (2013.01); *F16L 9/18* (2013.01); *F16L 57/02* (2013.01); *B23K 2101/06* (2018.08); *B23K 2101/10* (2018.08); *B23K 2103/04* (2018.08); *B23K 2103/05* (2018.08); *B23K 2103/18* (2018.08); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/13* (2015.01)

(58) Field of Classification Search
CPC ........ F16L 57/02; B23K 11/34; B23K 11/163; B23K 11/16; B23K 11/00; B23K 11/0006; B23K 11/002; B23K 11/0026; B23K 11/0073; B23K 11/08; B23K 11/087; B23K 11/0873; B23K 13/08; B23K 11/02; B23K 11/025; B23K 20/227; B23K 20/023; B23K 20/04; B23K 31/027; B23K 2101/06; B23K 2101/10; B23K 2103/04; B23K 2103/05; B23K 2103/18; C22C 38/58; C22C 38/44; C22C 38/001; C22C 38/002; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/38; C22C 38/40; C22C 38/42; C22C 38/46; C22C 38/48; C22C 38/50; B21C 37/08; B21C 51/00; B32B 1/08; B32B 15/00; B32B 15/01; B32B 15/011; B32B 15/04; B32B 15/043; B32B 15/18; Y10T 428/13; Y10T 428/12951; Y10T 428/12958; Y10T 428/12965; Y10T 428/12972; Y10T 428/12979
See application file for complete search history.

(56) References Cited

U.S. PATENT DOCUMENTS

2018/0243809 A1   8/2018  Okabe et al.
2019/0219218 A1*  7/2019  Ide ........................ B21C 51/00

FOREIGN PATENT DOCUMENTS

| CN | 202884274 U | 4/2013 |
|---|---|---|
| JP | S60221173 A | 11/1985 |
| JP | S61201759 A | 9/1986 |
| JP | S62156087 A | 7/1987 |

(56) References Cited

FOREIGN PATENT DOCUMENTS

| JP | H05154545 A | 6/1993 |
| JP | H0625746 A | 2/1994 |
| JP | H09155574 A | 6/1997 |
| JP | 2005133125 A | 5/2005 |
| JP | 2011089159 A | 5/2011 |
| JP | 2015105399 A | 6/2015 |
| JP | 2015120195 A | 7/2015 |
| KR | 1020130089647 A | 8/2013 |
| WO | 2016143271 A1 | 9/2016 |

OTHER PUBLICATIONS

Jul. 16, 2019, the Extended European Search Report issued by the European Patent Office in the corresponding European Patent Application No. 17819615.0.
Machine Translation, Okabe et al., JP 2015-120195, Jul. 2015. (Year: 2015).
Machine Translation, Suwa et al., JP 2005-133125, May 2005. (Year: 2005).
Machine Translation, Ueda et al., JP 61-201759, Sep. 1986. (Year: 1986).
Oct. 24, 2019, Office Action issued by the China National Intellectual Property Administration in the corresponding Chinese Patent Application No. 201780040123.X with English language search report.
Specification Sheet: Alloy 316/316L, downloaded from www.sandmeyersteel.com on Jan. 3, 2020, dated Jun. 2014. (Year: 2014).
May 20, 2020, Office Action issued by the Korean Intellectual Property Office in the corresponding Korean Patent Application No. 10-2019-7002672 with English language concise statement of relevance.

* cited by examiner (Z1 portion in detail)

Nozzle height H = 5~300mm
Preferred R/W > 1.0

Section of Z2 portion

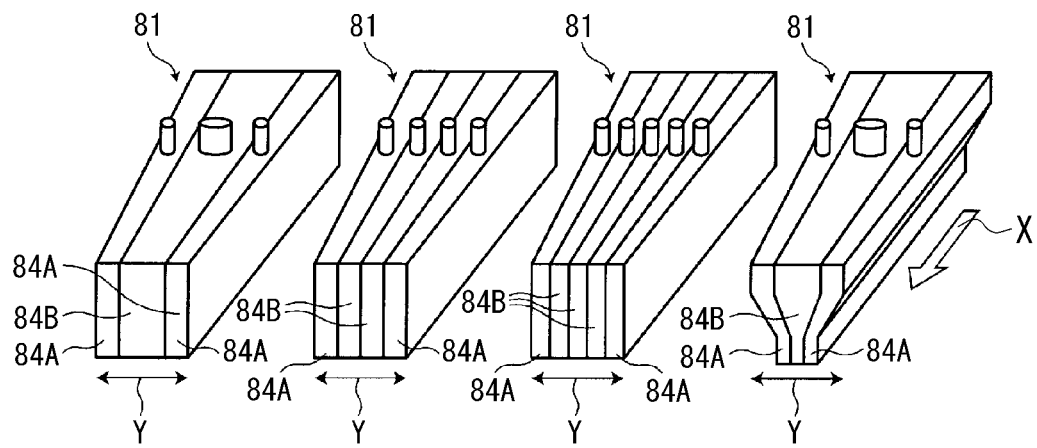
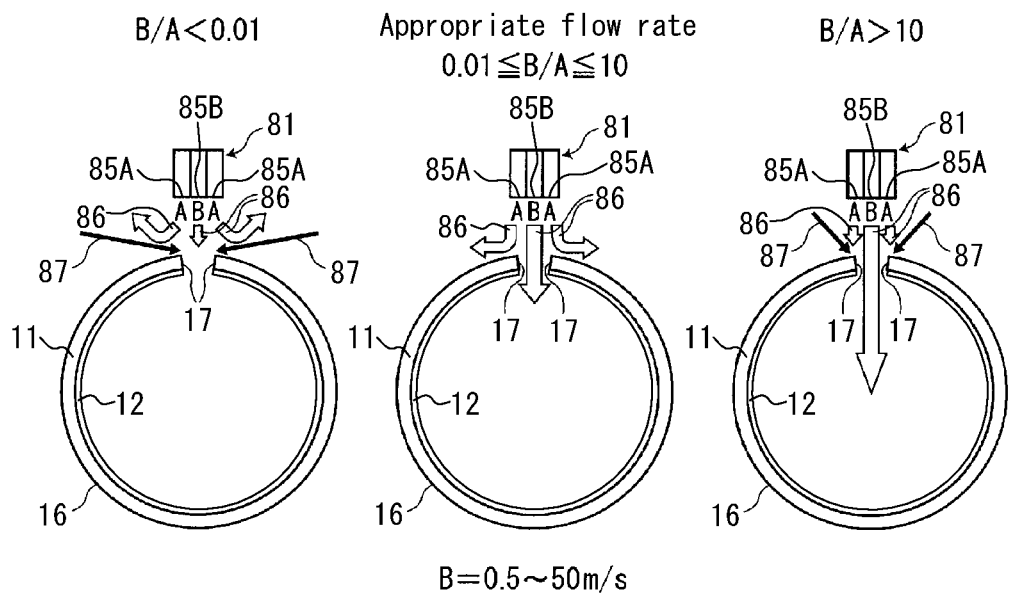

Large upset

Small upset

[ELECTRIC-RESISTANCE-WELDED STAINLESS CLAD STEEL PIPE OR TUBE]

ELECTRIC-RESISTANCE-WELDED STAINLESS CLAD STEEL PIPE OR TUBE

CROSS-REFERENCE TO RELATED APPLICATION

This application is a continuation of U.S. application Ser. No. 16/311,831 filed Dec. 20, 2018, which is a National Stage Application of PCT/JP2017/015789 filed Apr. 19, 2017, which claims priority based on Japanese Patent Application No. 2016-129630 filed Jun. 30, 2016, and Japanese Patent Application No. 2016-177921 filed Sep. 12, 2016. The disclosures of the prior applications are hereby incorporated by reference herein in their entirety.

TECHNICAL FIELD

The present disclosure relates to an electric-resistance-welded stainless clad steel pipe or tube and a method of producing the same.

BACKGROUND

An electric-resistance-welded steel pipe or tube is typically produced by forming a steel strip into a pipe or tube shape and, using squeeze rolls, butt pressing and welding the transverse ends of the steel strip heated and molten by high-frequency current and facing each other. It is commonly known that the weld of the electric-resistance-welded steel pipe or tube is lower in mechanical properties such as toughness and strength than the steel strip before the welding.

The lower properties of the weld are caused by, for example, oxide-based weld defects called penetrators. The penetrators remain in the weld, and decrease the toughness and strength of the weld. To prevent the penetrators from remaining in the weld, a measure is typically employed to increase the amount of upset by the squeeze rolls so that oxidized melts formed during the welding are discharged to outside the pipe or tube.

A technique proposed to improve the properties of the electric-resistance-welded steel pipe or tube is an electric-resistance-welded clad steel pipe or tube. The electric-resistance-welded clad steel pipe or tube is an electric-resistance-welded steel pipe or tube produced using a clad steel strip that is obtained by cladding a steel strip as base metal with a metal strip (cladding metal) made of a material different from the base metal. Combining the different materials in this way makes it possible to obtain a steel pipe or tube having excellent properties by benefiting from the properties of both the base metal and the cladding metal. For example, in the case of using carbon steel as the base metal and stainless steel as the cladding metal, an electric-resistance-welded clad steel pipe or tube having both the corrosion resistance of stainless steel and the strength of carbon steel can be obtained.

However, if the amount of upset is increased in the case of producing the electric-resistance-welded clad steel pipe or tube using the clad steel strip as raw material, a phenomenon that the molten steel and the heat-affected zone (HAZ) of base metal 11 enter the welded seam part of cladding metal 12 (on the steel pipe or tube inner surface side in FIG. 7A) occurs, as illustrated in FIG. 7A. In particular, if the amount of upset is excessively large, the base metal 11 is exposed at the cladding metal-side surface of the steel pipe or tube (the steel pipe or tube inner surface in FIG. 7A). This impairs the performance as a clad steel pipe or tube exploiting the excellent properties of the cladding metal.

For example, in an electric-resistance-welded clad steel pipe or tube produced using, as raw material, a stainless clad steel strip having low carbon steel as the base metal 11 and stainless steel as the cladding metal 12 with a large amount of upset where the cladding metal forms the inner layer and the base metal forms the outer layer, the low carbon steel enters the seam part of the stainless steel, or the low carbon steel is exposed at the steel pipe or tube inner surface as illustrated in FIG. 7A. This causes a significant decrease in corrosion resistance near a welded seam part 14 at the steel pipe or tube inner surface. Such an electric-resistance-welded clad steel pipe or tube cannot deliver required performance, when used in an environment in which the steel pipe or tube inner surface is required to be resistant to corrosion.

The conventional techniques thus have difficulty in preventing, in an electric-resistance-welded clad steel pipe or tube as electric resistance welded, both of a decrease of the mechanical properties of the weld and impairment of the function as a clad steel pipe or tube. Known techniques for addressing such a problem subject the electric-resistance-welded clad steel pipe or tube to additional treatment.

JP S60-221173 A (PTL 1) discloses a method of producing a clad pipe or tube, whereby at least the cladding metal-side bead of the weld bead formed by butt welding the facing edges of a clad steel sheet or steel strip bent in a pipe or tube shape is removed by cutting to a depth reaching the base metal, and the cut portion is subjected to weld overlaying in which a welding material having the similar properties as the cladding metal is used.

JP S62-156087 A (PTL 2) discloses a method of producing a clad steel pipe or tube, whereby, after forming a clad steel strip into an open pipe or tube and electric resistance welding the joint edge parts, any of the following is performed: causing melting and solidification to a depth of the clad interface along the welded seam in which dissimilar metal has entered, to dilute the dissimilar metal; and weld-overlaying the seam part in which dissimilar metal has entered with the same type of metal as the cladding metal, and rolling the overlaid weld to dilute the dissimilar metal.

JP H5-154545 A (PTL 3) discloses a method of producing a welded clad steel pipe or tube having cladding metal on the inner surface side, the method comprising forming a blank sheet or blank coil of clad steel into a tubular body so that the cladding metal forms an inner surface, subjecting at least a portion of butted parts of the cladding metal to electric resistance welding, and then subjecting the non-welded butted parts to weld overlaying.

CITATION LIST

Patent Literatures

PTL 1: JP S60-221173 A
PTL 2: JP S62-156087 A
PTL 3: JP H5-154545 A

SUMMARY

Technical Problem

However, the techniques described in PTL 1 to PTL 3 all need additional welding treatment after electric resistance welding, such as: removing the cladding metal bead part by cutting and weld-overlaying the cut portion (PTL 1); performing melting and solidification with a TIG arc heat source or the like along the welded seam or weld-overlaying the seam part (PTL 2); and weld-overlaying the non-welded butted parts (PTL 3). This decreases productivity, and increases the production cost. Besides, heat input in the additional weld overlaying coarsens the crystal grains of the heat-affected zone (HAZ), as a result of which the fracture property decreases. Furthermore, the corrosion resistance of the heat-affected zone (HAZ) tends to decrease with the formation of carbides or nitrides.

We also recognized the following new problem in producing an electric-resistance-welded stainless clad steel pipe or tube having carbon steel or low-alloy steel as the outer layer and austenitic stainless steel as the inner layer: For an electric-resistance-welded steel pipe or tube produced from a normal steel strip that is not a clad steel strip, the weld is typically subjected to heat treatment such as seam annealing after the welding, in order to improve the fracture property and the like of the weld. In the production of an electric-resistance-welded stainless clad steel pipe or tube, however, if heat treatment is performed after welding, the fracture property of the weld decreases, or the corrosion resistance of the pipe or tube inner surface decreases.

It could therefore be helpful to provide an electric-resistance-welded stainless clad steel pipe or tube that is excellent in both the fracture property of the weld and the corrosion resistance of the pipe or tube inner surface as electric resistance welded without conventionally required additional welding treatment such as weld overlaying after electric resistance welding, and a method of producing the same.

Solution to Problem

We conducted intensive study to solve the problems stated above, and discovered the following: In the case of, without covering a pipe or tube passage region from a butted part heating starting point to a welding point of an open pipe or tube with a shielding box, blowing shielding gas over the parts to be welded of the open pipe or tube from directly above the parts to be welded within the pipe or tube passage region, the oxygen concentration around the parts to be welded can be greatly reduced to suppress penetrator formation by using a shielding-gas blowing nozzle having a specific structure and appropriately controlling the nozzle height and the gas release conditions. Since penetrator formation can be suppressed even when the amount of upset in electric resistance welding is reduced to not greater than the thickness of the stainless clad steel strip, a weld having excellent fracture property can be obtained. With a small amount of upset, carbon steel or low-alloy steel forming the outer layer in the weld is kept from being exposed at the inner surface of the steel pipe or tube. Thus, a weld having excellent fracture property can be yielded without impairing the corrosion resistance of the pipe or tube inner surface.

We also examined the temperature of the pipe or tube inner surface (i.e. stainless steel) of the weld, with regard to heat treatment after welding. We consequently discovered that, by heating the weld so that the temperature at the pipe or tube inner surface of the weld is in a predetermined range and then controlling the cooling rate of the temperature to be in a predetermined range, the fracture property of the weld and the corrosion resistance of the pipe or tube inner surface can both be improved.

We thus provide:

(1) An electric-resistance-welded stainless clad steel pipe or tube, comprising: an outer layer of carbon steel or low-alloy steel; and an inner layer of austenitic stainless steel having a chemical composition containing (consisting of), in mass %, C: 0.1% or less, Si: 1.5% or less, Mn: 2.5% or less, Ni: 7.0% to 35.0%, Cr: 16.0% to 35.0%, Mo: 0.1% to 10.0%, and the balance being Fe and inevitable impurities, wherein a flatness value h/D in a 90° flattening test in accordance with JIS G 3445 is less than 0.3, and an inner surface of the electric-resistance-welded stainless clad steel pipe or tube has no crack in a sulfuric acid-copper sulfate corrosion test in accordance with ASTM A262-10, Practice E, where h is a flattening crack height in mm, and D is an outer diameter of the electric-resistance-welded stainless clad steel pipe or tube in mm.

(2) The electric-resistance-welded stainless clad steel pipe or tube according to (1), wherein the chemical composition further contains at least one of (i) N: 2.0% or less, (ii) Cu: 3.0% or less, (iii) at least one of Ti, Nb, V, and Zr: 0.01% to 0.5% in total, (iv) at least one of Ca, Mg, B, and REM: 0.1% or less each, and (v) Al: 0.2% or less.

(3) A method of producing an electric-resistance-welded stainless clad steel pipe or tube, the method comprising: preparing a stainless clad steel strip obtained by pressure-bonding a first layer made of carbon steel or low-alloy steel as base metal and a second layer made of austenitic stainless steel as cladding metal, the austenitic stainless steel having a chemical composition containing, in mass %, C: 0.1% or less, Si: 1.5% or less, Mn: 2.5% or less, Ni: 7.0% to 35.0%, Cr: 16.0% to 35.0%, Mo: 0.1% to 10.0%, and the balance being Fe and inevitable impurities; forming the stainless clad steel strip into a pipe or tube shape so that the first layer is an outer layer and the second layer is an inner layer, to obtain an open pipe or tube that is a cylindrical strip before welding; while subjecting a pair of butted parts of the open pipe or tube facing each other to gas shielding, butt pressing and electric resistance welding the pair of butted parts with an amount of upset of not greater than a thickness of the stainless clad steel strip, to obtain an electric-resistance-welded stainless clad steel pipe or tube, wherein the gas shielding is performed by blowing a shielding gas using a shielding-gas blowing nozzle having three or more slit-shaped gas outlets arranged in parallel with and adjacent to each other in a butting direction of the open pipe or tube at a position of 5 mm to 300 mm above upper ends of the butted parts of the open pipe or tube, under conditions that B is 0.5 m/s to 50 m/s and $0.01 \leq B/A \leq 10$, where A is a gas release flow rate in m/s from a pair of first gas outlets located at both ends among the gas outlets, and B is a gas release flow rate in m/s from a second gas outlet other than the first gas outlets; subjecting a weld after the electric resistance welding to heat treatment with a temperature at a pipe or tube inner surface of the weld being 800° C. to 1200° C.; and thereafter subjecting the weld to cooling with a cooling rate from 800° C. to 400° C. of the temperature at the pipe or tube inner surface of the weld being 4° C./s to 30° C./s.

(4) The method of producing an electric-resistance-welded stainless clad steel pipe or tube according to (3), wherein each of the gas outlets has a rectangular shape whose length as a size component in a pipe or tube passage direction is 30 mm or more and width as a size component in the butting direction of the open pipe or tube is 5 mm or more.

(5) The method of producing an electric-resistance-welded stainless clad steel pipe or tube according to (3) or (4), wherein R/W>1.0, where R is a total width of all of the gas outlets, and W is a maximum distance between the butted parts of the open pipe or tube directly below the gas outlets.

(6) The method of producing an electric-resistance-welded stainless clad steel pipe or tube according to any one of (3) to (5), wherein the shielding gas is composed of at least one of inert gas and reducing gas.

(7) The method of producing an electric-resistance-welded stainless clad steel pipe or tube according to any one of (3) to (6), wherein the chemical composition further contains at least one of (i) N: 2.0% or less, (ii) Cu: 3.0% or less, (iii) at least one of Ti, Nb, V, and Zr: 0.01% to 0.5% in total, (iv) at least one of Ca, Mg, B, and REM: 0.1% or less each, and (v) Al: 0.2% or less.

Advantageous Effect

The presently disclosed method of producing an electric-resistance-welded stainless clad steel pipe or tube can produce an electric-resistance-welded stainless clad steel pipe or tube that is excellent in both the fracture property of the weld and the corrosion resistance of the pipe or tube inner surface as electric resistance welded without conventionally required additional welding treatment such as weld overlaying after electric resistance welding.

The presently disclosed electric-resistance-welded stainless clad steel pipe or tube is excellent in both the fracture property of the weld and the corrosion resistance of the pipe or tube inner surface as electric resistance welded.

BRIEF DESCRIPTION OF THE DRAWINGS

In the accompanying drawings:

FIG. 3A is a schematic diagram illustrating an example of a nozzle usable in this embodiment;

FIG. 3B is a schematic diagram illustrating an example of the nozzle usable in this embodiment;

FIG. 3C is a schematic diagram illustrating an example of the nozzle usable in this embodiment;

FIG. 3D is a schematic diagram illustrating an example of the nozzle usable in this embodiment;

FIG. 4A is a diagram for explaining an appropriate range of a gas release flow rate B and a gas flow rate ratio B/A of shielding gas;

FIG. 4B is a diagram for explaining the appropriate range of the gas release flow rate B and the gas flow rate ratio B/A of the shielding gas;

FIG. 4C is a diagram for explaining the appropriate range of the gas release flow rate B and the gas flow rate ratio B/A of the shielding gas;

Figure 1:
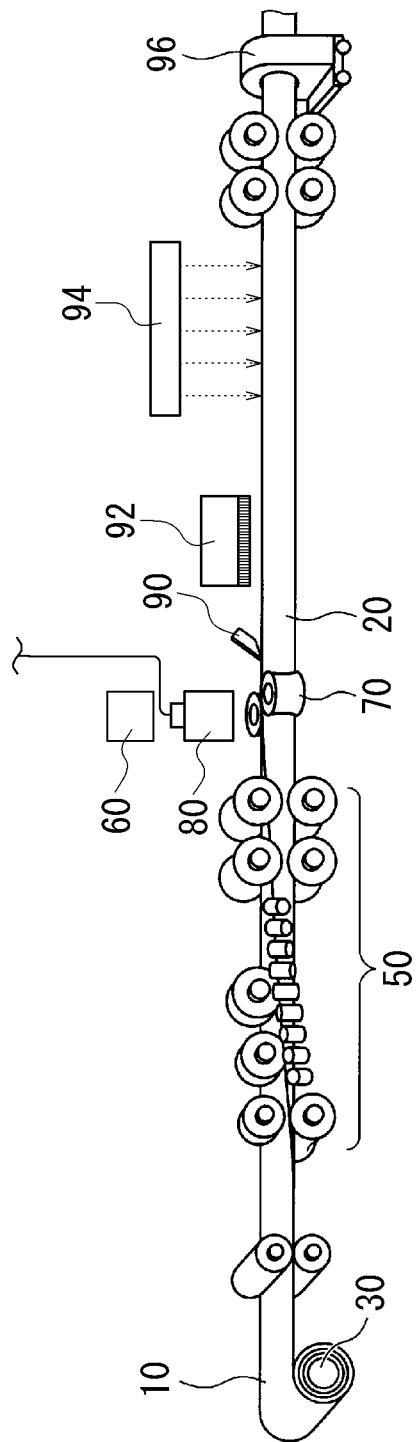
FIG. 1 is a schematic diagram of a production line for an electric-resistance-welded stainless clad steel pipe or tube according to one of the disclosed embodiments.

DETAILED DESCRIPTION (Method of Producing Electric-Resistance-Welded Stainless Clad Steel Pipe or Tube)

A process of producing an electric-resistance-welded stainless clad steel pipe or tube according to one of the disclosed embodiments is described below, with reference to FIG. 1. The production of an electric-resistance-welded stainless clad steel pipe or tube according to one of the disclosed embodiments includes the following steps: First, a stainless clad steel strip 10 in the form of a hot rolled coil is continuously uncoiled by an uncoiler 30. The stainless clad steel strip 10 is then formed into a pipe or tube shape by a roll former 50. Following this, the transverse ends of the steel strip as butted parts (parts to be welded) are, while being heated to a melting point or more by a high-frequency heating device 60, butt pressed by squeeze rolls 70 to be electric resistance welded, thus obtaining an electric-resistance-welded stainless clad steel pipe or tube 20. During this, the butted parts are subjected to gas shielding by a shielding-gas blowing device 80. After this, the weld bead on the outer surface and inner surface of the weld is cut by a bead cutter 90. The weld after the electric resistance welding is then heat-treated by a heating device 92, and further cooled by a cooling device 94. Subsequently, the pipe or tube 20 is cut to a predetermined length by a cutter 96.

The high-frequency heating device 60 may be any of a direct current heating device and an induction heating device. Electric resistance welding may be performed with an impeder (not illustrated) inserted on the pipe or tube inner surface side within a pipe or tube passage direction region including a current passage portion of high-frequency current.

Figure 2A:
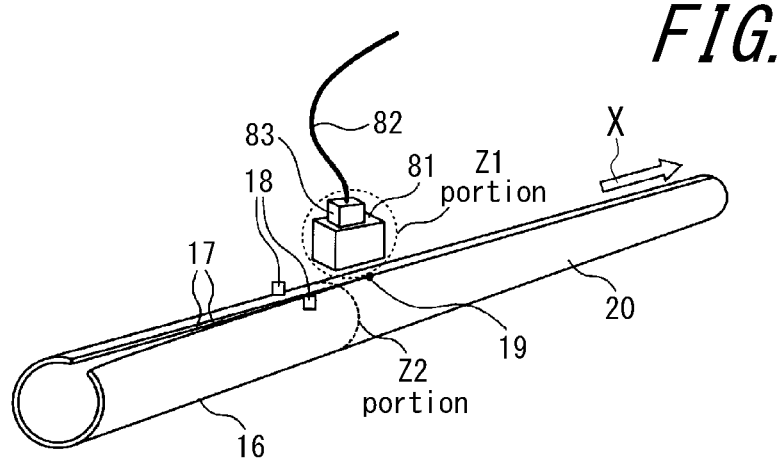
FIG. 2A is a schematic diagram for explaining gas shielding according to one of the disclosed embodiments, and is a perspective diagram of an open pipe or tube 16 and an electric-resistance-welded stainless clad steel pipe or tube 20 which are being transferred.
Figure 2B:
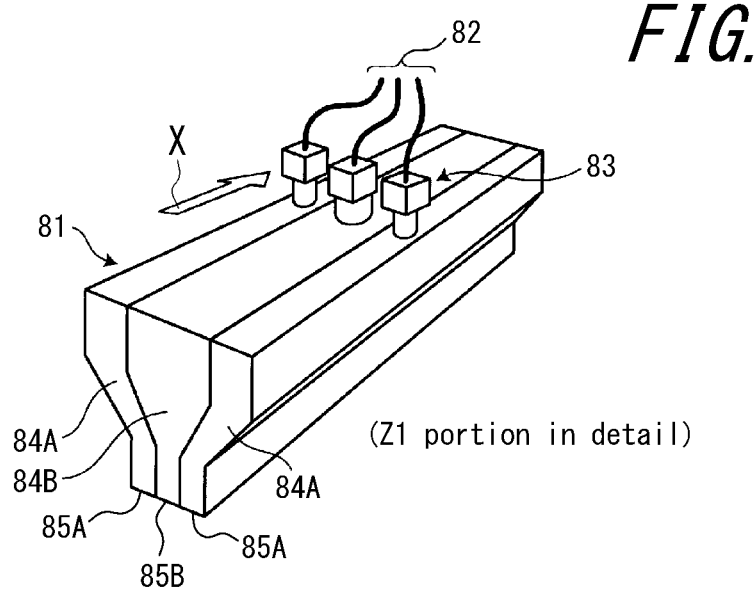
FIG. 2B is a schematic diagram for explaining gas shielding, and is an enlarged perspective diagram of a shielding-gas blowing nozzle 81 in a Z1 portion in FIG. 2A.
Figure 2C:
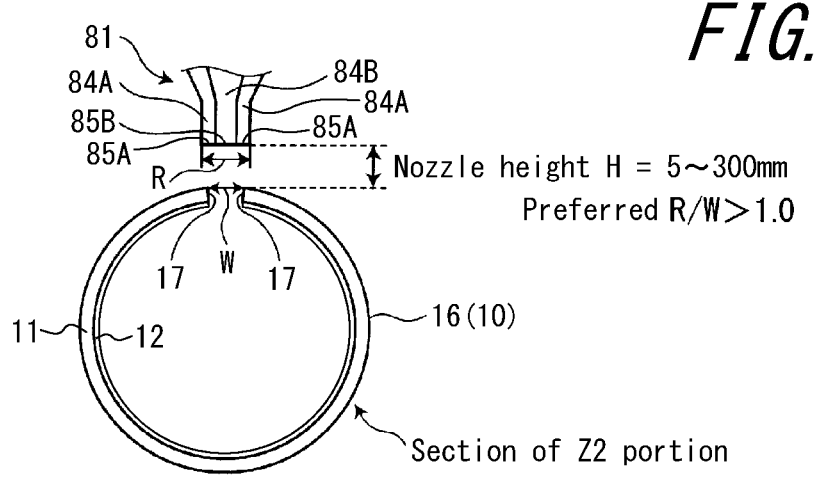
FIG. 2C is a schematic diagram for explaining gas shielding, and is a sectional diagram of a Z2 portion in FIG. 2A.

In this embodiment, electric resistance welding is performed using the stainless clad steel strip 10 obtained by pressure-bonding a first layer 11 made of carbon steel or low-alloy steel as base metal and a second layer 12 made of austenitic stainless steel as cladding metal where the second layer 12 as cladding metal is the inner layer and the first layer 11 as base metal is the outer layer, as illustrated in FIG. 2C. As used herein, the "base metal" denotes the material of the thicker layer in a clad steel strip composed of two layers that differ in thickness and material from each other, and the "cladding metal" denotes the material of the thinner layer. In this embodiment, carbon steel or low-alloy steel as the base metal is a material for ensuring the strength of the steel pipe or tube, and austenitic stainless steel as the cladding metal is a material for ensuring the corrosion resistance of the pipe or tube inner surface.

The carbon steel used as the base metal in this embodiment is not limited. It is, however, preferable to select a carbon steel whose specifications and mechanical properties are appropriate to the application of the clad steel pipe or tube, because the mechanical properties of the clad steel pipe or tube depend on the properties of the base metal occupying the major portion of the steel pipe or tube volume.

The low-alloy steel used as the base metal in this embodiment is not limited, as long as its total content of alloying elements is 5 mass % or less. A low-alloy steel may be selected according to the application of the clad steel pipe or tube, as with the above-mentioned carbon steel.

The chemical composition of the austenitic stainless steel used as the cladding metal in this embodiment is described below. In the following description, "%" regarding content denotes mass % unless otherwise noted.

C: 0.1% or Less

C combines with Cr in the steel and causes a decrease in corrosion resistance, and accordingly a lower C content is more desirable. If the C content is 0.1% or less, the corrosion resistance does not decrease significantly. The C content is therefore 0.1% or less. The C content is preferably 0.08% or less. No lower limit is placed on the C content, yet the lower limit is 0.001% from the industrial point of view.

Si: 1.5% or Less

Si is an element effective in deoxidation. However, if the Si content is excessive, an oxide tends to form in the electric resistance weld, which causes a decrease in weld properties. The Si content is therefore 1.5% or less. The Si content is preferably 1.0% or less. No lower limit is placed on the Si content, yet the lower limit is 0.01% from the industrial point of view.

Mn: 2.5% or Less

Mn is an element effective in strength improvement. However, if the Mn content is excessive, an oxide tends to form in the electric resistance weld, which causes a decrease in weld properties. The Mn content is therefore 2.5% or less. The Mn content is preferably 2.0% or less. No lower limit is placed on the Mn content, yet the lower limit is 0.001% from the industrial point of view.

Ni: 7.0% to 35.0%

Ni is an element that stabilizes austenite phase. If the Ni content is less than 7.0%, stable austenite phase cannot be obtained in the case where 16.0% or more Cr that stabilizes ferrite phase is contained. If the Ni content is more than 35.0%, the production cost increases, which is economically disadvantageous. Accordingly, the Ni content needs to be in a range of 7.0% to 35.0%.

Cr: 16.0% to 35.0%

Cr is an important element that forms a passive film on the surface of the steel pipe or tube to maintain corrosion resistance. This effect is achieved if the Cr content is 16.0% or more. If the Cr content is more than 35.0%, hot workability decreases, and austenite single phase microstructure is difficult to be obtained. The Cr content is therefore 16.0% to 35.0%. The Cr content is preferably 18.0% to 30.0%.

Mo: 0.1% to 10.0%

Mo is an element effective in inhibiting local corrosion such as crevice corrosion. To achieve this effect, the Mo content needs to be 0.1% or more. If the Mo content is more than 10.0%, the austenitic stainless steel is embrittled significantly. The Mo content is therefore 0.1% to 10.0%. The Mo content is preferably 0.5% to 7.0%.

In addition to C, Si, Mn, Ni, Cr, and Mo described above, the following elements may be contained as appropriate.

N: 2.0% or Less

N has an effect of inhibiting local corrosion. It is, however, industrially difficult to have a N content of more than 2.0%, and so the upper limit of the N content is 2.0%. Moreover, in a typical steelmaking method, if the N content is more than 0.4%, adding N in the steelmaking stage requires a long time, which causes a decrease in productivity. Accordingly, the N content is more preferably 0.4% or less, in terms of cost. The N content is further preferably in a range of 0.01% to 0.3%.

Cu: 3.0% or Less

Cu is an element having an effect of improving corrosion resistance. To achieve this effect, the Cu content is preferably 0.01% or more. If the Cu content is more than 3.0%, hot workability decreases, causing a decrease in productivity. Accordingly, in the case of containing Cu, the Cu content is preferably 3.0% or less. The Cu content is more preferably in a range of 0.01% to 2.5%.

At Least One of Ti, Nb, V, and Zr: 0.01% to 0.5% in Total

Ti, Nb, V, and Zr are each an element effective in improving the intergranular corrosion resistance of the austenitic stainless steel, by reacting with C in the austenitic stainless steel to form a carbide and fix C. To achieve this effect, the total content of at least one of Ti, Nb, V, and Zr is preferably 0.01% or more. If the total content of at least one of Ti, Nb, V, and Zr, whether added singly or in combination, is more than 0.5%, the effect is saturated. Accordingly, in the case of containing at least one of Ti, Nb, V, and Zr, the total content is 0.5% or less.

Besides the above-mentioned elements, at least one of Ca, Mg, B, and rare earth element (REM) may be contained in an amount of 0.1% or less each in order to improve the hot workability of the austenitic stainless steel, and Al may be contained in an amount of 0.2% or less for deoxidation in the molten steel stage.

The balance of the chemical composition is Fe and inevitable impurities. Of the inevitable impurities, O is preferably contained in an amount of 0.02% or less.

As illustrated in FIGS. 2A and 2C, in this embodiment, the stainless clad steel strip 10 is formed into a pipe or tube shape so that the first layer 11 is the outer layer and the second layer 12 is the inner layer, to obtain an open pipe or tube 16 that is a cylindrical strip before welding. A pair of butted parts (parts to be welded) 17 of the open pipe or tube facing each other are, while being subjected to gas shielding, butt pressed and electric resistance welded, to obtain the electric-resistance-welded stainless clad steel pipe or tube 20.

In FIG. 2A, reference sign 18 is the butted part heating starting point of the open pipe or tube, and reference sign 19 is the welding point representing the position in the pipe or tube passage direction at which the parts 17 to be welded are joined. In this embodiment, the entire region in the pipe or tube passage direction from the heating starting point 18 to the welding point 19 or a zone within that region where oxides tend to form between the parts to be welded (this zone can be located by preliminary investigation) is defined as the shielding range in the electric resistance welding, and a shielding-gas blowing nozzle 81 (hereafter also simply referred to as "nozzle") is placed directly above the parts 17 to be welded in the shielding range.

The nozzle 81 is split into three layers in the open pipe or tube butting direction Y, as illustrated in FIGS. 2B, 3A, and 3D. Alternatively, the nozzle 81 may be split into four or more layers in the open pipe or tube butting direction Y, as illustrated in FIGS. 3B and 3C. Thus, the nozzle 81 has three or more split nozzles arranged in parallel with and adjacent to each other in the open pipe or tube butting direction Y. The three or more split nozzles are made up of a pair of first split nozzles 84A located at both ends and a remaining second split nozzle (or nozzles) 84B. Each split nozzle is hollow inside, and forms a gas flow path independent of the other split nozzles. Each of the split nozzles 84A and 84B is supplied with shielding gas from a corresponding gas pipe 82, and the amount of the gas supplied is controlled by a gas flow adjusting device 83. The tip of each of the pair of first split nozzles 84A defines a slit-shaped first gas outlet 85A, and the tip of each second split nozzle 84B defines a slit-shaped second gas outlet 85B. The nozzle 81 is placed so that the gas outlets 85A and 85B face the upper ends of the parts 17 to be welded.

We examined in detail the flow of the shielding gas. We also researched in detail the influence of various shielding gas blowing conditions, such as the position and size of each of the gas outlets 85A and 85B and the flow rate of the shielding gas through each of the gas outlets 85A and 85B, on the oxygen concentration around the parts 17 to be welded during electric resistance welding and the oxide area ratio in the weld formed by electric resistance welding the parts to be welded.

We consequently discovered that, under the optimum shielding gas blowing conditions, the oxygen concentration around the parts to be welded is 0.01 mass % or less, and as a result the oxide area ratio in the weld is less than 0.1%, with it being possible to obtain a weld having excellent fracture property. Herein, the oxide area ratio in the weld is defined as follows: A fracture surface formed by subjecting an electric resistance weld to a Charpy impact test is observed for at least 10 observation fields at 500 or more magnifications using an electron microscope. The total area of oxide-containing dimple fracture surface areas found in the fracture surface is measured, and the ratio of this total area to the total observation field area is taken to be the oxide area ratio.

The determined optimum conditions are as follows: The nozzle height H, i.e. the height from the upper ends of the parts 17 to be welded to the gas outlets 85A and 85B, is 5 mm or more and 300 mm or less (see FIG. 2C), and the shielding gas is blown under the conditions that B is 0.5 m/s to 50 m/s and $0.01 \leq B/A \leq 10$, where A (m/s) is the gas release flow rate from the pair of first gas outlets 85A located at both ends, and B (m/s) is the gas release flow rate from the remaining second gas outlet (or outlets) 85B.

If the nozzle height H is more than 300 mm, the amount of shielding gas reaching the parts 17 to be welded is insufficient, so that the oxygen concentration around the parts 17 to be welded is more than 0.01 mass %, and a weld having excellent fracture property cannot be obtained. If the nozzle height H is less than 5 mm, radiant heat from the parts 17 to be welded being heated tends to damage the gas outlets 85A and 85B, and also a spatter from the parts 17 to be welded collides with the nozzle 81 and decreases the durability of the nozzle 81.

If the flow rate B is excessively low, the shielding gas spreads out and the gas shielding of the parts 17 to be welded is insufficient, so that the oxygen concentration around the parts 17 to be welded is more than 0.01 mass % and a weld having excellent fracture property cannot be obtained. If the flow rate B is excessively high, the shielding gas blows too intensely and causes air entrainment between the end surfaces of the parts 17 to be welded. The appropriate range of the flow rate B is therefore 0.5 m/s to 50 m/s. In the case where there are a plurality of second gas outlets 85B at the center (e.g. FIGS. 3B and 3C), the flow rates B at the respective second gas outlets need not necessarily be the same, and may be different from each other as long as the flow rates B are within the appropriate range.

Even when the flow rate B is within the appropriate range, however, if the gas flow rate ratio B/A, i.e. the ratio between the flow rate B and the flow rate A, is inappropriate, air entrainment 87 occurs as illustrated in FIGS. 4A to 4C.

With reference to FIG. 4A, in the case where B/A<0.01, the gas flows from the first gas outlets 85A at both ends are too intense, and the gas flow from the second gas outlet 85B at the center is too weak. Accordingly, the gas flows from the first gas outlets 85A at both ends reflect off the outer surface of the open pipe or tube 16, and deflect upward. This causes the gas flow rate in the reflection region to be close to 0, as a result of which air entrainment 87 occurs along the outer surface of the open pipe or tube 16. Consequently, the oxygen concentration around the parts 17 to be welded cannot be reduced sufficiently, and a weld having excellent fracture property cannot be obtained.

With reference to FIG. 4C, in the case where B/A>10, the gas flow from the second gas outlet 85B at the center is too intense, and the gas flows from the first gas outlets 85A at both ends are too weak. Accordingly, the gas flow from the second gas outlet 85B at the center draws air into the gap between the end surfaces of the parts 17 to be welded, and facilitates air entrainment 87. Consequently, the oxygen concentration around the parts 17 to be welded cannot be reduced sufficiently, and a weld having excellent fracture property cannot be obtained.

With reference to FIG. 4B, in the case where $0.01 \leq B/A \leq 10$, shielding gas 86 sufficiently but not excessively fills the gap between the end surfaces of the parts 17 to be welded, without air entrainment. Consequently, the oxygen concentration around the parts 17 to be welded is 0.01 mass % or less, and a weld having excellent fracture property can be obtained. In the case where there are a plurality of second gas outlets 85B at the center and the flow rates at the respective second gas outlets are different from each other, B/A calculated using the maximum one of the flow rates as the "flow rate B" is to satisfy the above-mentioned conditions.

Figure 5:
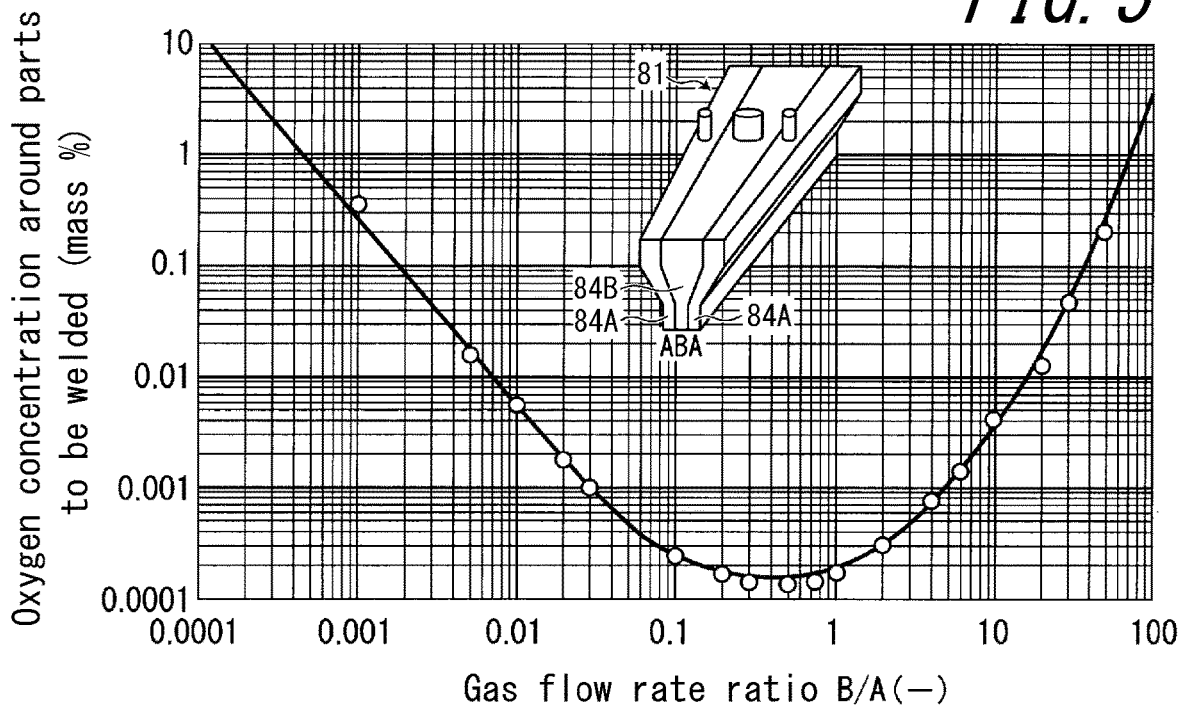
FIG. 5 is a graph illustrating the relationship between the gas flow rate ratio B/A of the shielding gas and the oxygen concentration around the parts to be welded.

FIG. 5 is a graph illustrating, as an example, the results of measuring the oxygen concentration at an intermediate position between the end surfaces of the parts 17 to be welded. The shielding gas 86 was blown over the parts 17 to be welded, with a nozzle height H of 50 mm and varying gas flow rate ratios B/A within the appropriate range of $0.5 \leq B \leq 50$. A stainless clad steel strip having low-carbon low-alloy steel with a thickness of 5 mm as the base metal on the pipe or tube outer surface side and austenitic stainless steel (SUS316L) with a thickness of 2 mm as the cladding metal on the pipe or tube inner surface side was used.

As illustrated in FIG. 5, an oxygen concentration of 0.01 mass % or less around the parts to be welded can be well (i.e. reliably) achieved by controlling the gas flow rate ratio B/A to $0.01 \leq B/A \leq 10$ within the appropriate range of 0.5 B 50. Moreover, as illustrated in FIG. 5, $0.03 \leq B/A \leq 5$ is preferable because a lower oxygen concentration level of 0.001 mass % to 0.0001 mass % can be achieved.

We confirmed that the same results were obtained even when other conditions such as the nozzle height H were changed.

Figure 6:
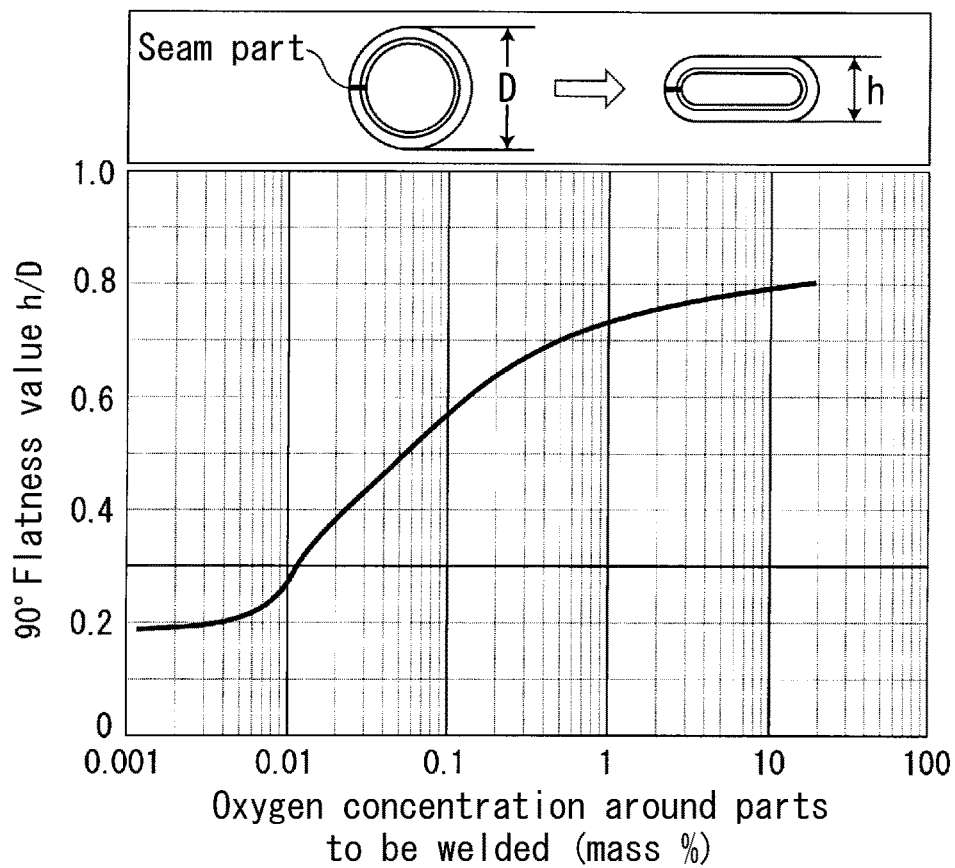
FIG. 6 is a graph illustrating the relationship between the oxygen concentration around the parts to be welded and the flatness value h/D of the electric-resistance-welded stainless clad steel pipe or tube in a 90° flattening test.
Figure 7A:
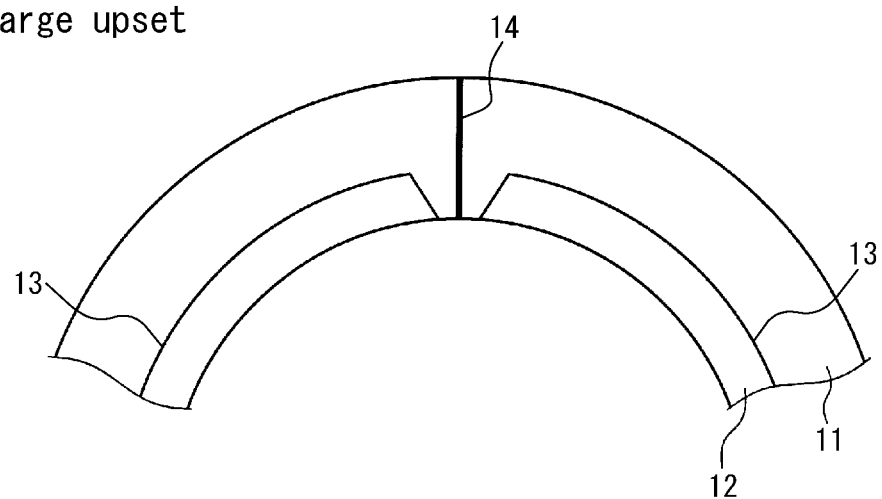
FIG. 7A is a schematic sectional diagram of an electric resistance weld and its vicinity in the case where the amount of upset is large.
Figure 7B:
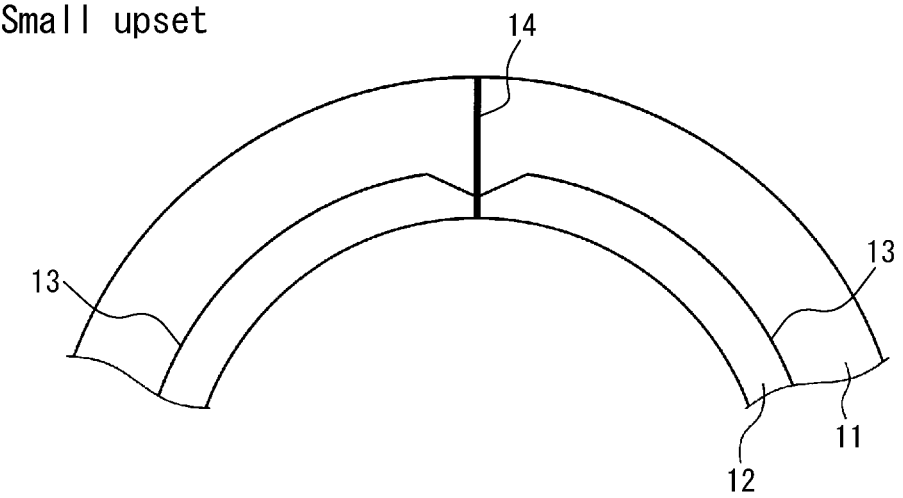
FIG. 7B is a schematic sectional diagram of an electric resistance weld and its vicinity in the case where the amount of upset is small.

FIG. 6 is a graph illustrating the relationship between the oxygen concentration around the parts to be welded and the flatness value h/D of each electric-resistance-welded stainless clad steel pipe or tube in a 90° flattening test. A stainless clad steel strip having low-carbon low-alloy steel with a thickness of 5 mm as the base metal on the pipe or tube outer surface side and austenitic stainless steel (SUS316L) with a thickness of 2 mm as the cladding metal on the pipe or tube inner surface side was used. As illustrated in FIG. 7B, electric-resistance-welded stainless clad steel pipes or tubes were produced with varying oxygen concentrations around the parts to be welded, while limiting the amount of upset to 1.0 mm which is not greater than the thickness of the stainless clad steel strip so as to prevent the base metal on the pipe or tube outer surface side from being exposed at the pipe or tube inner surface after the electric resistance welding. Subsequently, the weld was subjected to post-welding heat treatment with the heating temperature at the pipe or tube inner surface of the weld being 1000° C. and the cooling rate of the temperature at the pipe or tube inner surface being 10° C./s. A test piece of 50 mm in length was then collected, and a 90° flattening test in accordance with JIS G 3445 was performed to obtain the flatness value h/D.

As illustrated in FIG. 6, each electric-resistance-welded stainless clad steel pipe or tube produced in an atmosphere of an oxygen concentration of 0.01 mass % or less around the parts to be welded showed a flatness value h/D (h: flattening crack height, D: pipe or tube outer diameter) of less than 0.3 in the 90° flattening test, i.e. had a weld with excellent fracture property.

The combined shape of all of the gas outlets 85A and 85B is preferably a rectangular shape whose length, i.e. an X component of the size in the pipe or tube passage direction, is 30 mm or more and width (total width R in FIG. 2C), i.e. a Y component of the size in the open pipe or tube butting direction, is 5 mm or more. Such a shape contributes to more uniform gas blowing over the parts 17 to be welded.

It is also preferable to satisfy R/W>1.0, where R is the total width of all of the gas outlets 85A and 85B, and W is the maximum distance between the butted parts of the open pipe or tube directly below the gas outlets, as illustrated in FIG. 2C. This allows for a more rapid reduction in the oxygen concentration around the parts 17 to be welded.

In this embodiment, the shielding gas is composed of at least one of inert gas and reducing gas.

As used herein, the term "inert gas" refers to gases such as nitrogen gas, helium gas, argon gas, neon gas, and xenon gas, mixtures of two or more of these gases, and the like.

The shielding gas is preferably a gas containing 0.1 mass % or more reducing gas. Such a gas is more effective in suppressing the formation of oxides responsible for penetrators, thus further improving the toughness or strength of the weld. As used herein, the term "reducing gas" refers to gases such as hydrogen gas, carbon monoxide gas, methane gas, and propane gas, mixtures of two or more of these gases, and the like. The gas containing 0.1 mass % or more reducing gas is preferably reducing gas alone or a gas containing 0.1 mass % or more reducing gas and the balance being inert gas.

The following shielding gases are preferred for their availability and low cost:

(a) If inert gases are used alone, (G1) any one of nitrogen gas, helium gas, and argon gas or a mixture of two or more of these gases is preferred.

(b) If reducing gases are used alone, (G2) any one of hydrogen gas and carbon monoxide gas or a mixture of these gases is preferred.

(c) If mixtures of inert gases and reducing gases are used, a mixture of the gases (G1) and (G2) is preferred.

Note that careful safety measures are to be taken if gases containing hydrogen gas and/or carbon monoxide gas are used.

In this embodiment, the amount of upset is limited to not greater than the thickness of the stainless clad steel strip. This prevents the carbon steel or low-alloy steel of the outer layer in the weld from being exposed at the inner surface of the steel pipe or tube. The amount of upset is preferably not less than 20% of the thickness of the stainless clad steel strip, in terms of ensuring the effect of discharging penetrators from the weld during the electric resistance welding. The amount of upset by the squeeze rolls is determined by measuring the outer perimeter of the pipe or tube situated in front of the squeeze rolls, then measuring the outer perimeter of the pipe or tube after welding the parts to be welded by the squeeze rolls and cutting the weld bead portion on the outer surface, and calculating the difference between these outer perimeters.

In this embodiment, the conditions of the heat treatment performed on the weld after the electric resistance welding are optimized. In detail, the weld after the electric resistance welding is subjected to heat treatment with the temperature at the pipe or tube inner surface of the weld being 800° C. to 1200° C., and then subjected to cooling with the cooling rate from 800° C. to 400° C. of the temperature at the pipe or tube inner surface of the weld being 4° C./s to 30° C./s. Both the fracture property of the weld and the corrosion resistance of the pipe or tube inner surface can be improved in this way.

If the heating temperature at the pipe or tube inner surface of the weld is less than 800° C., the homogenization and grain refinement of the microstructure of the weld of the base metal and the solutionizing of the cladding metal are insufficient, and so the effect of improving the fracture property of the weld and the corrosion resistance of the pipe or tube inner surface cannot be achieved. If the heating temperature is more than 1200° C., the microstructure of the weld of the base metal coarsens, which causes a decrease in the toughness, i.e. fracture property, of the weld.

If the cooling rate is less than 4° C./s, the austenitic stainless steel as the cladding metal is sensitized, and as a result the corrosion resistance of the weld at the pipe or tube inner surface decreases. If the cooling rate is more than 30° C./s, the carbon steel or low-alloy steel as the base metal forms a high-hardness quenched microstructure, and the fracture property of the weld decreases.

The heating conditions and the cooling conditions in the post-welding heat treatment are controlled by the heating device 92 and the cooling device 94 illustrated in FIG. 1. The heating method and the cooling method are not limited, as long as the above-mentioned heating temperature and cooling rate are achieved. Examples of the heating method include induction heating, direct current heating, and heating by an atmosphere heating furnace. Examples of the cooling method include air cooling, air blast cooling, water cooling, and heat releasing by a pipe or tube formation tool (such as rolls or rollers).

(Electric-Resistance-Welded Stainless Clad Steel Pipe or Tube)

An electric-resistance-welded stainless clad steel pipe or tube according to this embodiment is obtained by the production method described above. The electric-resistance-welded stainless clad steel pipe or tube is composed of an outer layer of carbon steel or low-alloy steel and an inner layer of austenitic stainless steel having the chemical composition described above, and has an electric resistance weld that has undergone weld bead cutting and post-welding heat treatment as electric resistance welded. As used herein, the expression "as electric resistance welded" means that additional welding treatment such as weld overlaying is not performed after electric resistance welding.

The electric-resistance-welded stainless clad steel pipe or tube according to this embodiment is excellent in both the fracture property of the weld and the corrosion resistance of the pipe or tube inner surface as electric resistance welded, that is, the flatness value h/D in a 90° flattening test in accordance with JIS G 3445 is less than 0.3 and the pipe or tube inner surface has no crack in a sulfuric acid-copper sulfate corrosion test in accordance with ASTM A262-10, Practice E, where h is the flattening crack height (mm) and D is the pipe or tube outer diameter (mm). Cracks at the pipe or tube inner surface can be clearly determined based on the criteria defined in the standard.

EXAMPLES

Example 1

Each stainless clad steel strip composed of: cladding metal of austenitic stainless steel having a thickness of 2 mm and a chemical composition containing, in mass %, C: 0.015%, Si: 0.76%, Mn: 1.06%, Ni: 12.2%, Cr: 17.4%, Cu: 0.24%, Mo: 2.32%, and the balance being Fe and inevitable impurities; and base metal of low-carbon low-alloy steel having a thickness of 5 mm and a chemical composition containing, in mass %, C: 0.04%, Si: 0.2%, Mn: 1.60%, V: 0.04%, Nb: 0.05%, Ti: 0.01%, and the balance being Fe and inevitable impurities was prepared.

An electric-resistance-welded stainless clad steel pipe or tube of 300 mm in outer diameter was produced under various conditions by the electric-resistance-welded steel pipe or tube production line illustrated in FIG. 1, using the prepared stainless clad steel strip as raw material with the base metal forming the outer layer and the cladding metal forming the inner layer. During the electric resistance welding, the parts to be welded were shielded with shielding gas using the nozzle illustrated in FIGS. 2A to 2C under the conditions of nozzle height H, gas release flow rate B, flow rate ratio B/A, and R/W shown in Table 1. The shielding gas was nitrogen as inert gas. In some of the levels in Table 1, inert gas was mixed with propane gas as reducing gas. The amount of upset is shown in Table 1.

The weld after the electric resistance welding was subjected to heat treatment with the temperature at the pipe or tube inner surface of the weld being the value shown in Table 1, and then subjected to cooling with the cooling rate from 800° C. to 400° C. of the temperature at the pipe or tube inner surface of the weld being the value shown in Table 1.

In each level, the oxygen concentration around the parts to be welded was measured. Moreover, a test piece was collected from each produced steel pipe or tube, and a 90° flattening test in accordance with JIS G 3445 was performed to obtain the flatness value h/D. The results are shown in Table 1.

In addition, the corrosion resistance of the pipe or tube inner surface was evaluated by a sulfuric acid-copper sulfate corrosion test in accordance with ASTM A262-10, Practice E, with reference to API specification 5LD, 4th Edition. To evaluate the corrosion resistance of the pipe or tube inner surface, the pipe or tube outer surface side (base metal side) was removed by grinding while leaving the pipe or tube inner surface side, to obtain a test piece made only of the stainless steel. In the evaluation of the corrosion resistance, the test piece after the test was observed visually or observed at 10 magnifications using a stereoscopic microscope or the like as appropriate, and each test piece observed to have no crack was determined as "pass" and each test piece observed to have any crack was determined as "fail".

As shown in Table 1, the Examples exhibited huge reductions in the flatness value h/D of the weld as compared with the Comparative Examples, i.e. had a weld having excellent fracture property and also maintaining the corrosion resistance of the austenitic stainless steel at the inner surface.

TABLE 1

| | Gas shielding conditions | | | | | | Post-welding heat treatment conditions | | Evaluation | | |
| | | | | | | | Heating | Cooling rate | | | |
| Level | Nozzle height H (mm) | Gas release flow rate B (m/s) | Gas flow rate ratio B/A | R/W | Reducing gas content (mass %) | Amount of upset (mm) | Oxygen concentration around parts to be welded (mass % × 10$^2$) | temperature of pipe or tube inner surface (° C.) | of pipe or tube inner surface temperature (°C/s) | Flatness value of weld h/D | Corrosion test on pipe or tube inner surface | Category |
|---|---|---|---|---|---|---|---|---|---|---|---|---|
| 1 | 100 | 0.5 | 0.5 | 5 | 0 | 4 | 0.03 | 1150 | 5 | 0.2 | Pass | Example |
| 2 | 100 | 1.0 | 0.5 | 5 | 0 | 4 | 0.04 | 950 | 5 | 0.1 | Pass | Example |
| 3 | 100 | 5 | 0.5 | 5 | 0 | 4 | 0.02 | 1100 | 6 | 0.1 | Pass | Example |
| 4 | 100 | 10 | 0.1 | 5 | 0 | 4 | 0.04 | 1000 | 8 | 0.1 | Pass | Example |
| 5 | 100 | 50 | 0.03 | 5 | 0 | 4 | 0.06 | 1100 | 8 | 0.1 | Pass | Example |
| 6 | 200 | 0.5 | 3 | 5 | 0 | 4 | 0.08 | 900 | 4 | 0.1 | Pass | Example |
| 7 | 200 | 1.0 | 2 | 5 | 0 | 4 | 0.09 | 1100 | 5 | 0.1 | Pass | Example |
| 8 | 200 | 5 | 10 | 5 | 0 | 4 | 0.3 | 1000 | 6 | 0.2 | Pass | Example |
| 9 | 200 | 10 | 0.01 | 5 | 0 | 4 | 0.2 | 1000 | 9 | 0.2 | Pass | Example |
| 10 | 200 | 50 | 0.05 | 5 | 0 | 4 | 0.1 | 1000 | 10 | 0.2 | Pass | Example |
| 11 | 50 | 0.5 | 0.5 | 5 | 0 | 4 | 0.1 | 950 | 5 | 0.2 | Pass | Example |
| 12 | 50 | 1.0 | 3 | 5 | 0 | 4 | 0.07 | 950 | 8 | 0.2 | Pass | Example |
| 13 | 50 | 5 | 0.2 | 5 | 0 | 4 | 0.04 | 950 | 5 | 0.1 | Pass | Example |
| 14 | 50 | 10 | 0.3 | 5 | 0 | 4 | 0.05 | 950 | 4 | 0.1 | Pass | Example |
| 15 | 50 | 50 | 0.5 | 5 | 0 | 4 | 0.1 | 950 | 5 | 0.2 | Pass | Example |
| 16 | 50 | 10 | 0.5 | 10 | 0 | 2 | <0.01 | 1000 | 6 | 0.1 | Pass | Example |
| 17 | 50 | 10 | 2 | 2 | 0 | 2 | 0.03 | 1000 | 5 | 0.1 | Pass | Example |
| 18 | 50 | 10 | 2 | 1.0 | 0 | 2 | 0.05 | 1000 | 8 | 0.1 | Pass | Example |
| 19 | 20 | 10 | 0.5 | 20 | 0 | 7 | <0.01 | 1000 | 5 | 0.1 | Pass | Example |
| 20 | 20 | 10 | 0.5 | 5 | 0 | 7 | <0.01 | 1000 | 5 | 0.1 | Pass | Example |
| 21 | 300 | 10 | 0.2 | 5 | 0 | 1 | 0.2 | 1000 | 6 | 0.2 | Pass | Example |
| 22 | 50 | 10 | 0.03 | 5 | 0.1 | 1 | <0.01 | 1000 | 5 | 0.1 | Pass | Example |
| 23 | 50 | 10 | 0.5 | 5 | 3 | 3 | <0.01 | 1000 | 8 | 0.1 | Pass | Example |
| 24 | 50 | 10 | 1 | 5 | 5 | 3 | <0.01 | 1000 | 5 | 0.1 | Pass | Example |
| 25 | 50 | 5 | 3 | 1.0 | 5 | 3 | <0.01 | 1000 | 4 | 0.1 | Pass | Example |
| 26 | 50 | 5 | 5 | 0.8 | 5 | 3 | <0.01 | 1000 | 5 | 0.1 | Pass | Example |
| 27 | 400 | 1.0 | 1 | 5 | 0 | 4 | 15 | 1000 | 5 | 0.5 | Pass | Comparative Example |

TABLE 1-continued

| | | Gas shielding conditions | | | | | Post-welding heat treatment conditions | | Evaluation | | |
|---|---|---|---|---|---|---|---|---|---|---|---|
| | | | | | | | Heating | Cooling rate | | | |
| Level | Nozzle height H (mm) | Gas release flow rate B (m/s) | Gas flow rate ratio B/A | R/W | Reducing gas content (mass %) | Amount of upset (mm) | Oxygen concentration around parts to be welded (mass % × 10²) | temperature of pipe or tube inner surface (° C.) | of pipe or tube inner surface temperature (°C/s) | Flatness value of weld h/D | Corrosion test on pipe or tube inner surface | Category |
| 28 | 100 | 0.4 | 1 | 5 | 0 | 4 | 160 | 1000 | 6 | 0.8 | Pass | Comparative Example |
| 29 | 100 | 60 | 1 | 5 | 0 | 4 | 3 | 1000 | 5 | 0.4 | Pass | Comparative Example |
| 30 | 400 | 60 | 1 | 5 | 0 | 4 | 40 | 1000 | 4 | 0.6 | Pass | Comparative Example |
| 31 | 100 | 60 | 1 | 5 | 5 | 4 | 2 | 1000 | 8 | 0.4 | Pass | Comparative Example |
| 32 | 50 | 10 | 0.5 | 10 | 0 | 8 | <0.01 | 1000 | 4 | 0.1 | Fail | Comparative Example |
| 33 | 50 | 10 | 2 | 2 | 0 | 8 | 0.02 | 1000 | 5 | 0.1 | Fail | Comparative Example |
| 34 | 50 | 10 | 2 | 1.0 | 0 | 8 | 0.05 | 1000 | 6 | 0.1 | Fail | Comparative Example |
| 35 | 20 | 10 | 0.5 | 20 | 0 | 8 | <0.01 | 1000 | 5 | 0.1 | Fail | Comparative Example |
| 36 | 20 | 10 | 0.5 | 5 | 0 | 8 | <0.01 | 1000 | 8 | 0.1 | Fail | Comparative Example |
| 37 | 400 | 1.0 | 1 | 5 | 0 | 10 | 12 | 1000 | 7 | 0.4 | Fail | Comparative Example |
| 38 | 100 | 0.5 | 0.5 | 5 | 0 | 4 | 0.03 | 1000 | 2 | 0.2 | Fail | Comparative Example |
| 39 | 100 | 0.5 | 0.5 | 5 | 0 | 4 | 0.03 | 1000 | 50 | 0.5 | Pass | Comparative Example |
| 40 | 100 | 0.5 | 0.5 | 5 | 0 | 4 | 0.03 | 1180 | 5 | 0.2 | Pass | Example |
| 41 | 100 | 0.5 | 0.5 | 5 | 0 | 4 | 0.03 | 810 | 5 | 0.2 | Pass | Example |
| 42 | 100 | 0.5 | 0.5 | 5 | 0 | 4 | 0.03 | 1150 | 30 | 0.2 | Pass | Example |
| 43 | 100 | 0.5 | 0.5 | 5 | 0 | 4 | 0.03 | 1150 | 35 | 0.4 | Pass | Comparative Example |
| 44 | 100 | 0.5 | 0.5 | 5 | 0 | 4 | 0.03 | 750 | 5 | 0.4 | Fail | Comparative Example |
| 45 | 100 | 0.5 | 0.5 | 5 | 0 | 4 | 0.03 | 1230 | 5 | 0.5 | Pass | Comparative Example |

Example 2

Each stainless clad steel strip composed of: cladding metal of austenitic stainless steel having a thickness of 2 mm and the chemical composition (balance being Fe and inevitable impurities) shown in Table 2; and base metal of low-carbon low-alloy steel having a thickness of 5 mm and a chemical composition containing, in mass %, C: 0.04%, Si: 0.2%, Mn: 1.60%, V: 0.04%, Nb: 0.05%, Ti: 0.01%, and the balance being Fe and inevitable impurities was prepared.

An electric-resistance-welded stainless clad steel pipe or tube of 300 mm in outer diameter was produced by the electric-resistance-welded steel pipe or tube production line illustrated in FIG. 1, using the prepared stainless clad steel strip as raw material with the base metal being on the pipe or tube outer surface side and the cladding metal being on the pipe or tube inner surface side. During the electric resistance welding, the parts to be welded were shielded with shielding gas using the nozzle illustrated in FIGS. 2A to 2C under the conditions of nozzle height H=50 mm, gas release flow rate B=10 m/s, flow rate ratio B/A=0.5, and R/W=5. The shielding gas was nitrogen as inert gas. The amount of upset was 4 mm.

The weld after the electric resistance welding was subjected to heat treatment with the temperature at the pipe or tube inner surface of the weld being 1000° C., and then subjected to cooling with the cooling rate from 800° C. to 400° C. of the temperature at the pipe or tube inner surface of the weld being 10° C./s.

The measurement of the oxygen concentration around the parts to be welded and the evaluation of the fracture property of the weld and the corrosion resistance of the pipe or tube inner surface were performed by the same methods as in Example 1. The results are shown in Table 3.

As is clear from Table 3, the electric-resistance-welded stainless clad steel pipe or tube in each Example was excellent in both the fracture property of the weld and the corrosion resistance of the pipe or tube inner surface, whereas each Comparative Example in which the chemical composition of the cladding metal was outside the presently disclosed range was inferior in the fracture property of the weld or the corrosion resistance of the pipe or tube inner surface.

TABLE 2

(mass %)

| Steel | C | Si | Mn | Cr | Ni | Mo | Others | Category |
|---|---|---|---|---|---|---|---|---|
| a | 0.057 | 0.33 | 0.99 | 18.5 | 8.2 | — | | Comparative Example |
| b | 0.015 | 0.76 | 1.06 | 17.4 | 12.2 | 2.32 | Cu: 0.24 | Example |
| c | 0.012 | 0.72 | 0.97 | 22.2 | 25.1 | 6.08 | | Example |
| d | 0.150 | 0.51 | 1.21 | 18.1 | 8.5 | 1.02 | | Comparative Example |
| e | 0.061 | 1.8 | 0.85 | 18.3 | 8.1 | 0.59 | | Comparative Example |
| f | 0.062 | 0.68 | 3.2 | 18.7 | 8.6 | 2.51 | | Comparative Example |
| g | 0.071 | 0.71 | 1.15 | 15.1 | 8.3 | 0.23 | | Comparative Example |

TABLE 3

| Steel | Oxygen concentration around parts to be welded (mass % × $10^2$) | Flatness value of weld h/D | Corrosion test on pipe or tube inner surface | Category |
|---|---|---|---|---|
| a | 0.05 | 0.1 | Fail | Comparative Example |
| b | 0.05 | 0.1 | Pass | Example |
| c | 0.05 | 0.1 | Pass | Example |
| d | 0.05 | 0.3 | Fail | Comparative Example |
| e | 0.05 | 0.3 | Pass | Comparative Example |
| f | 0.05 | 0.3 | Pass | Comparative Example |
| g | 0.05 | 0.1 | Fail | Comparative Example |

INDUSTRIAL APPLICABILITY

The presently disclosed method of producing an electric-resistance-welded stainless clad steel pipe or tube can produce an electric-resistance-welded stainless clad steel pipe or tube that is excellent in both the fracture property of the weld and the corrosion resistance of the pipe or tube inner surface as electric resistance welded without conventionally required additional welding treatment such as weld overlaying after electric resistance welding.

REFERENCE SIGNS LIST 10 stainless clad steel strip
11 first layer (base metal)
12 second layer (cladding metal)
13 clad interface
14 welded seam part
16 open pipe or tube
17 part to be welded (butted part of open pipe or tube)
18 butted part heating starting point of open pipe or tube
19 welding point
20 electric-resistance-welded stainless clad steel pipe or tube
30 uncoiler
50 roll former
60 high-frequency heating device
70 squeeze roll
80 shielding-gas blowing device
81 shielding-gas blowing nozzle
82 gas pipe
83 gas flow adjusting device
84A first split nozzle (both ends)
84B second split nozzle (center)
85A first gas outlet (both ends)
85B second gas outlet (center)
86 shielding gas
87 air entrainment
90 bead cutter
92 heating device
94 cooling device
96 cutter
X pipe or tube passage direction
Y open pipe or tube butting direction

The invention claimed is:

1. An electric-resistance-welded stainless clad steel pipe or tube, comprising:
   an outer layer of carbon steel or low-alloy steel; and
   an inner layer of austenitic stainless steel having a chemical composition containing, in mass %, C: 0.1% or less, Si: 1.5% or less, Mn: 2.5% or less, Ni: 7.0% to 35.0%, Cr: 16.0% to 35.0%, Mo: 0.1% to 10.0%, and the balance being Fe and inevitable impurities,
   wherein a welded seam part exits in the electric-resistance-welded stainless clad steel pipe or tube, and
   wherein a flatness value h/D in a 90° flattening test in accordance with JIS G 3445 is less than 0.3, and an inner surface of the electric-resistance-welded stainless clad steel pipe or tube has no crack in a sulfuric acid-copper sulfate corrosion test in accordance with ASTM A262-10, Practice E, where h is a flattening crack height in mm, and D is an outer diameter of the electric-resistance-welded stainless clad steel pipe or tube in mm.

2. The electric-resistance-welded stainless clad steel pipe or tube according to claim 1,
   wherein the chemical composition further contains at least one of (i) N: 2.0% or less, (ii) Cu: 3.0% or less, (iii) at least one of Ti, Nb, V, and Zr: 0.01% to 0.5% in total, (iv) at least one of Ca, Mg, B, and REM: 0.1% or less each, and (v) Al: 0.2% or less.

* * * * *